Jan. 16, 1951 R. WALLAUSCHEK 2,538,544

HYPERFREQUENCY WIDE-BAND IMPEDANCE MATCHING NETWORK

Filed June 17, 1949 5 Sheets-Sheet 1

INVENTOR:
RICHARD WALLAUSCHEK
By: Haseltine, Lake & Co.
AGENTS

Jan. 16, 1951 R. WALLAUSCHEK 2,538,544

HYPERFREQUENCY WIDE-BAND IMPEDANCE MATCHING NETWORK

Filed June 17, 1949 5 Sheets-Sheet 2

INVENTOR:
RICHARD WALLAUSCHEK
By: Haseltine, Lake & Co.
AGENTS

Jan. 16, 1951 R. WALLAUSCHEK 2,538,544

HYPERFREQUENCY WIDE-BAND IMPEDANCE MATCHING NETWORK

Filed June 17, 1949 5 Sheets-Sheet 3

INVENTOR:
RICHARD WALLAUSCHEK
By:
Haseltine, Lake & Co.
AGENTS

INVENTOR:
RICHARD WALLAUSCHEK
By: Haseltine, Lake & Co.
AGENTS

HYPERFREQUENCY WIDE-BAND IMPEDANCE MATCHING NETWORK

Filed June 17, 1949 5 Sheets-Sheet 5

INVENTOR:
RICHARD WALLAUSCHEK
By: Haseltine, Lake & Co.
AGENTS

Patented Jan. 16, 1951

2,538,544

UNITED STATES PATENT OFFICE 2,538,544

HYPERFREQUENCY WIDE-BAND IMPEDANCE MATCHING NETWORK

Richard Wallauschek, L'Etang-la-Ville, France

Application June 17, 1949, Serial No. 99,812
In France June 16, 1948

6 Claims. (Cl. 178—44)

Figures 1, 2:
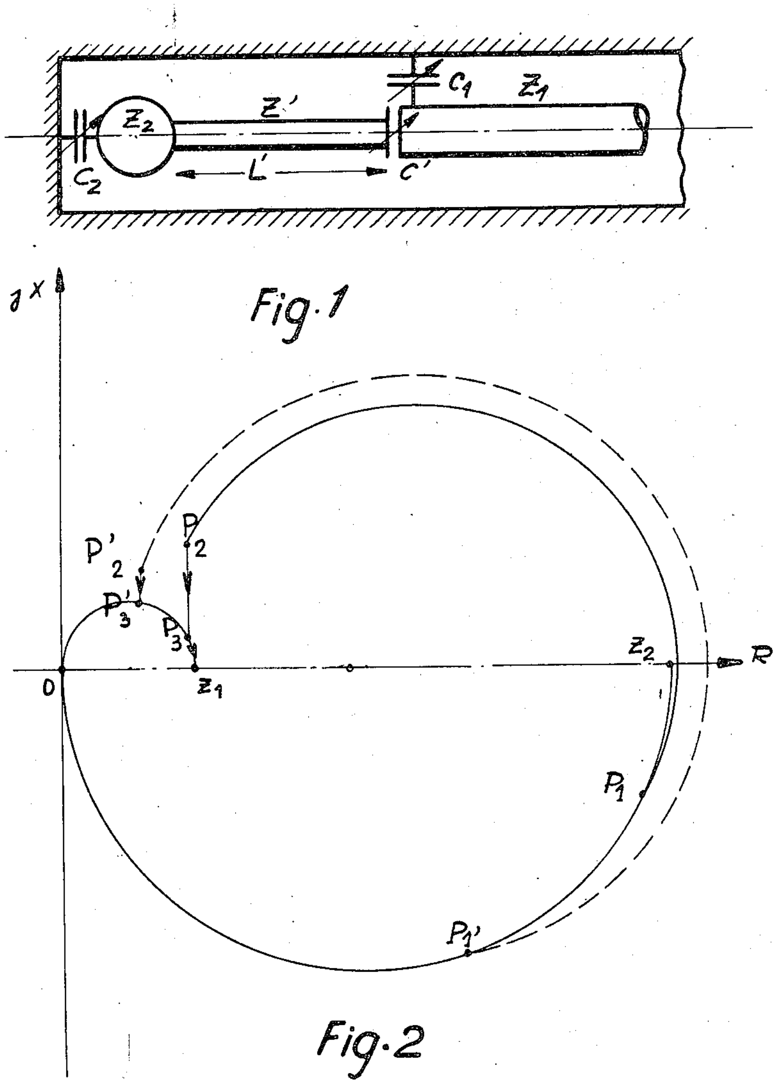

The present invention relates to an impedance transforming device with a high transformation ratio, adjustable and applicable to a wide frequency band in the hyperfrequency range.

In the hyperfrequency technique, the problem is often encountered of transforming an impedance into another impedance of any value. In practice, special circumstances, associated with each particular case limit the generality of the problem thus stated, and lead to the distinguishing of several types of transformers. Each one of these types is adapted to a certain application or group of applications; new requirements often lead to the design of new types of transformers.

The object of the present invention is a matching network which has been especially designed for application to the case of the matching of two widely different impedances over a wide band of frequencies and with a good efficiency, while providing for certain adjustments whose necessity often arises in the course of the operation of an ultra-high frequency system, as, for example, altering the impedance-transformation ratio or the mean frequency of the frequency band to be transmitted. Such circumstances are frequently encountered when one of the impedances to be matched is that of a built-in part of an electronic tube which is liable to be often replaced; or, alternately, it may be desired to change the operating frequency band without replacing the impedance-matching network.

The invention concerns an impedance transformer particularly well-adapted to these various purposes, and offering the following advantages:

1. A very high impedance transformation ratio, of the order of 5 to 10, for example.
2. A transformation ratio adjustable over a certain transformation range.
3. A wide enough frequency band for any adjustment of its elements.

The realisation of the transformer device is effected by using, either two-conductor lines or wave guides. These two possibilities also exist for the realisation of the aforesaid built-in part inside the tube.

While impedance-matching devices including quarter-wave lines or transmission line sections used as substitutes for inductances or capacitances at high frequencies have long been known, such devices lack flexibility, particularly as concerns their adaptability to alteration of their mean working frequency or their transformation ratio. The object of the present invention is to obviate these drawbacks by using a combination comprising a transformation line whose length is close to a quarter wave-length, associated with three adjustable condensers in a particular arrangement.

In accordance with the invention, the matching network comprises, in combination, a transformation line whose length is close to a quarter wave-length and whose characteristic impedance is intermediate between the two impedances to be matched, a series capacity for obtaining a wide compensation of the selectivity and two shunt capacities, one at the input, the other one at the output of the device, whose capacitive reactances are variable and may be adjusted so as to modify the impedance transformation ratio of the whole device.

The respective functions and interactions of the various elements of the device appear from the detailed description which will now be given. This description is made in connection with the appended drawings wherein:

Figure 1 represents an electric diagram of the device;

Figures 2 to 5, inclusive, are diagrams, in the complex plane, of the impedances at the various points of the hyperfrequency chain.

Figure 6:
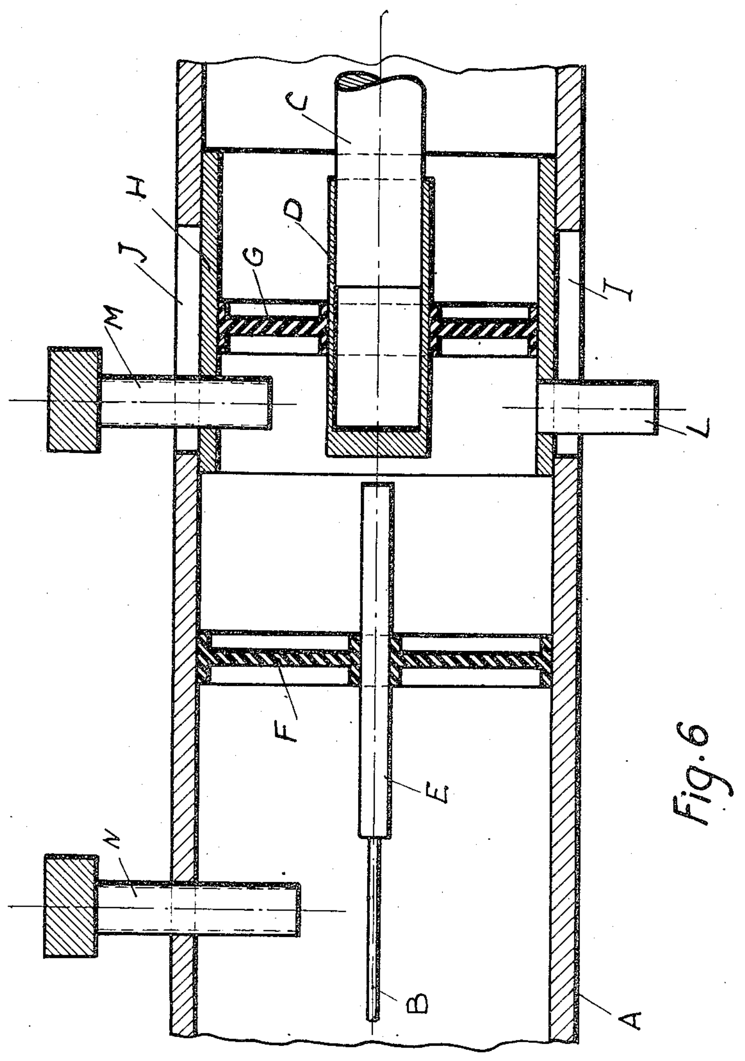

Figure 6 shows an example of a practical embodiment of the device of the invention.

In the case in which both impedances to be matched are those of coaxial lines, said case being chosen for description purposes, the device is shown schematically on Figure 1. The output line, with a characteristic impedance $Z_2$, is assumed to be normal to the plane of the figure. For a better explanation (in practice the input and output lines are often perpendicular to each other), the other impedance $Z_1$ is represented by a line assumed to be terminated by its characteristic impedance $Z_1$. The two lines are connected by a line of length $L'$, and of characteristic impedance $Z'$. But between $Z'$ and $Z_1$, a variable capacity $C'$ is inserted while $Z'$ and $Z_2$, as the case may be, are either in direct contact or electrically associated by a capacity large enough to present an impedance which is negligible with respect to $Z'$. A variable shunt capacity $C_1$ is further connected at the input to $Z_1$ and another variable capacity $C_2$ at the output of $Z_2$. There is included in $C_2$, the reactance caused by the disturbance due to the passing from $Z_2$ to $Z'$, a disturbance which is generally equivalent to a shunt capacity.

The group of values $Z'$, $L'$, $C'$, $C_1$, $C_2$ is selected in such a manner that the matching is established between $Z_1$ and $Z_2$. The matching of two impedances being, in principle, a two-parameter problem, an infinity of such transformations are obtainable with the five parameters shown. This transformation is described in Figure 2 for two different embodiments by using a conventional representation of the impedances in the complex plane.

The image of impedance $Z_2$, assumed real, is on the real axis OR of the diagram of Figure 2. The effect of the shunt capacity $C_2$ is manifested by a displacement along a circle going through the image $Z_2$ of the real impedance and the origin O, and whose center is on OR. This displacement $Z_2P_1$ is determined by the value of $C_2$. The transformation along Z′ is represented by a displacement $P_1P_2$ on a circle whose center is on OR, the center and the radius being dependent upon the given points Z′ and $P_1$ while the displacement $P_1P_2$ depends on the length L′. Point $P_2$ then represents the impedance obtained at the opposite end of said line of length L′. The connecting of C′ in series causes the displacement $P_2P_3$, the connecting of the capacity $C_1$ in shunt completes the transformation and must lead to the point representing $Z_1$, by a displacement $P_3Z_1$ along a circle passing through O and $Z_1$ and whose center is on OR. A second realization, similar to this transformation is represented in broken lines, also on Figure 2.

The excess number of parameters available gives the possibility of also meeting the other requirements imposed on this matching network. For constructional reasons, a solution is desired in which Z′ and L′ are well matched but fixed values, and the variation of the transformation ratio will be effected solely by modifying the capacities $C_1$, $C_2$ and C′.

Figure 3:
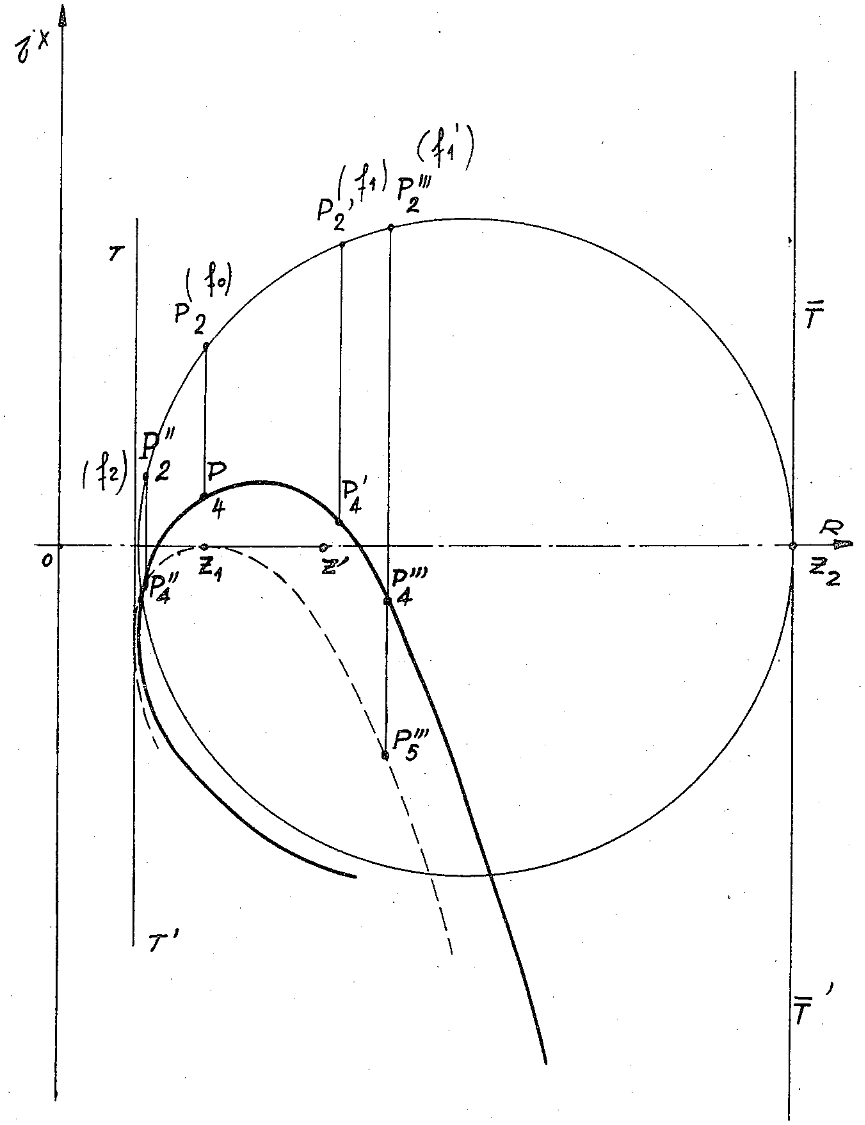

For a better distinguishing of the effects of each one of these parameters, assume first $C_1 = C_2 = 0$. Figure 3 then represents for an average frequency $f_0$, the transformation effected by a transformation line Z′, of a length L′, on a real impedance $Z_2$ (transformation $Z_2P_2$), followed by a transformation $P_2P_4$ caused by a series capacity C′.

For a frequency $f_1$, lower than $f_0$, the electrical length L′ decreases, and, consequently, the transformation due to line Z′ is represented (Figure 3), by a smaller displacement $Z_2P_2'$, while the vertical displacement due to capacity C′ increases, which is manifested by a lengthening of $P_2'P_4'$. The reverse takes place for a frequency $f_2$ higher than $f_0$ (images $P_2''$ and $P_4''$).

It will be seen that a certain compensation of the selectivity exists in the device; it is due to the fact that the sense of the vertical displacement, corresponding to the series capacity, as a function of the frequency, is inverse to that of the component parallel with TT′, the most important one, of the displacement corresponding to the transformation line. The curve $P_4''$, $P_4$, $P_4'$, $P_4'''$ which is the locus of the end of the vector representing the input impedance to the device, is tangent to the vertical tangent TT′ of the transformation circle and asymptotic to the other vertical tagent TT′. With a suitable choice of the impedance $Z_1$, the vector representing the transformed impedance at the end of this line does not differ too much from vector $OZ_1$ at frequencies close to $f_0$.

With a smaller capacity C′, one may obtain an exact matching at point $Z_1$, for frequency $f_0$, but in such a case the pass band becomes smaller (see the dotted curve of Figure 3). In fact, if capacity C′ is decreased, to obtain the exact matching for a certain frequency $f_0$, it will be seen that point $P_4'''$ must be replaced by $P_5'''$ for the corresponding frequency $f_1'$, the distance $Z_1P_5'''$ then becomes larger than its initial value $Z_1P_4'''$.

It amounts to the same thing to say that the transformation coefficient for frequency $f_1'$ has been decreased by the modification of C′. For this reason, in general, the desire for an exact matching, at one frequency will be sacrificed to the obtention of a sufficient matching inside a wide band, even if an exact matching is never effected.

Generally, the transmission quality of the matching network may be characterized by giving the transmission curve, i. e. the curve showing the variations of the transmission coefficient $t$ as a function of frequency:

$$t=\frac{4.p}{(p+1)^2}$$

with $$p=\frac{(\overline{OZ_1})^2+(\overline{OP}\,\overline{OP})-\sqrt{((\overline{OZ_1})^2+(\overline{OP}.\overline{OP}))^2-(\overline{OZ_1})^2(\overline{OP}+\overline{OP})^2}}{(\overline{OZ_1})(\overline{OP}+\overline{OP})}$$

$\overline{OP}$ being the vector radius of a point P variable along the curve containing all the points resulting from the transformation in the complex plane of impedances (points $P_4$, $P_4'$, $P_4''$, $P_4'''$, etc. of Figure 3). The transmission range is determined by the range within which the transmission coefficient differs from unity only by a value lower than a limiting value.

Conversely, if one considers impedances $Z_1$ and $Z_2$ as given, one finds, for each transformation line whose impedance Z′ is lower than $$\sqrt{Z_1Z_2}$$

a capacity C′ which gives, over a certain frequency range around $f_0$ an input impedance not too different from $Z_1$. The more Z′ is lower than $$\sqrt{Z_1Z_2}$$

the wider this range is, but the larger the impedance variation is inside this range. The choice of the three values Z′, L′, C′ thus defines, for a given impedance $Z_2$, the frequency band and the variation of the transmission curve.

Figure 4:
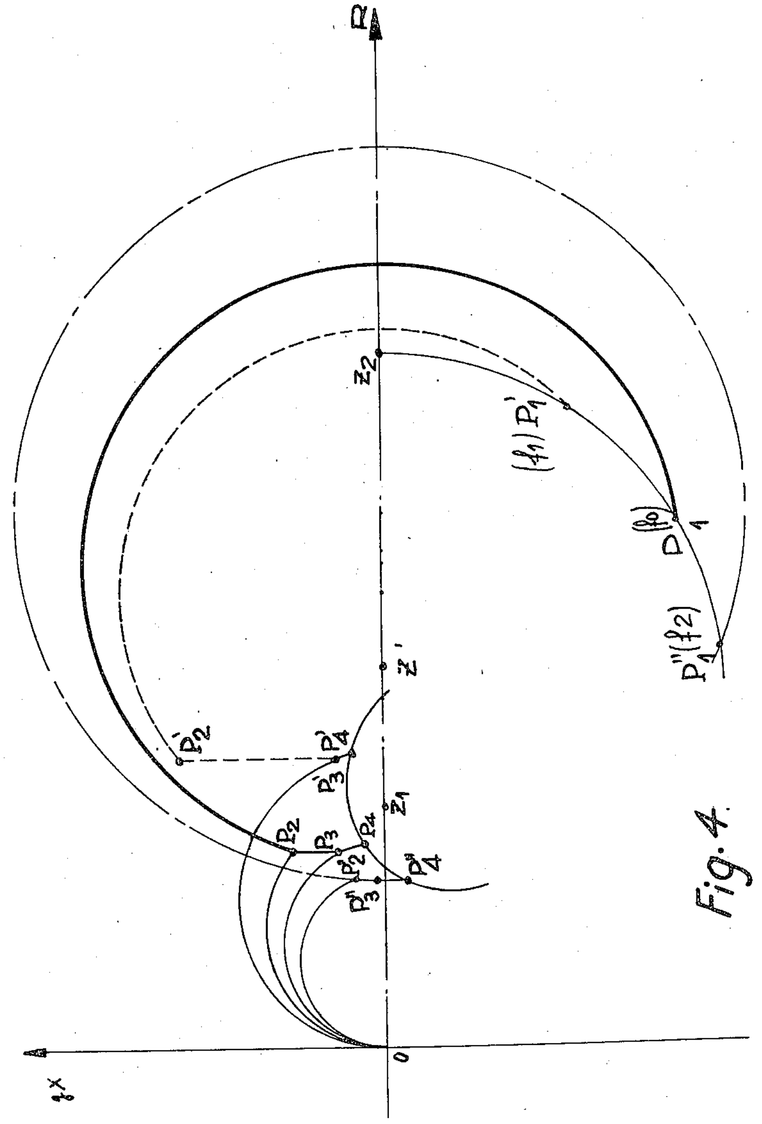

Consider now the effect of capacities $C_1$ and $C_2$. Since the electrical distance between these two capacities is approximately a quarter wavelength their effects on the system cancel each other if the ratio of their reactances is approximately equal to the transformation ratio of the transformer. Suppose that $\overline{C_1}$ and $\overline{C_2}$ are such values; Figure 4 shows the diagram of the resulting transformation. An accurate investigation of the problem shows that the presence of capacities $C_1$ and $C_2$ decreases, either by narrowing the band or by making the matching less accurate, the transmission qualities, this decrease being smaller when the capacities are smaller, but it does not involve any qualitative variation of the operation described in Figure 3. The locus of points $P_4$ shows the same compensation of selectivity about a certain frequency $f_0$.

Finally, we shall consider the case of a possible variation of the internal impedance $Z_2$, i. e. particularly the case where a tube is changed. Assume first that for an average frequency $f_0$ and with capacities $\overline{C_1}$, $\overline{C_2}$, which, for an average adjustment are fairly small and are further in a ratio equal to the transformation ratio, the matching, for an average output impedance $Z_2$, be effected according to the transformation $Z_2$, $P_1$, $P_2$, $P_3$, $Z_1$ of Figure 5.

Figure 5:
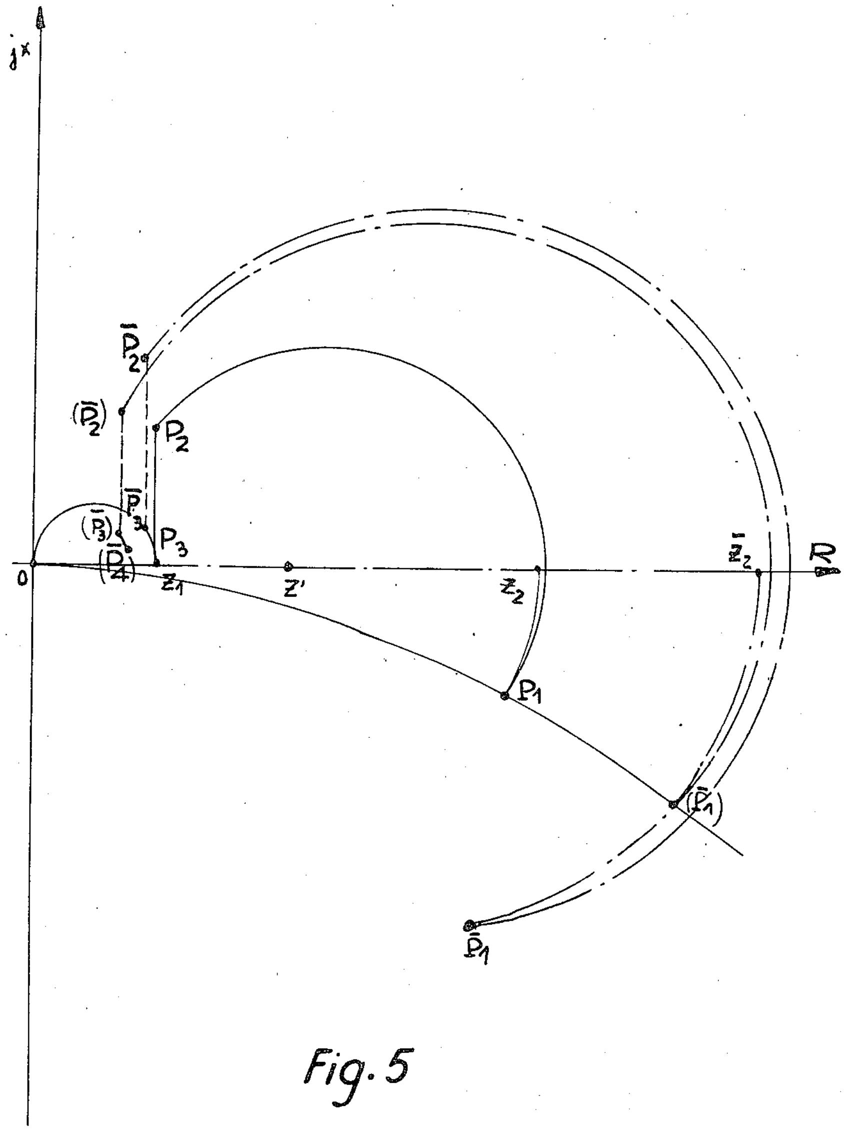

For a higher output impedance $\overline{Z_2}$, the transformation $\bar{Z}_2$, $(\bar{P}_1)$, $(\bar{P}_2)$, $(\bar{P}_3)$, $(\bar{P}_4)$ corresponding to the same values $\bar{C}_1$, $\bar{C}_2$, $C'$ does not give a matching with $Z_1$. The matching, however, is obtainable with slightly higher capacities $C_1$ and $C_2$ and a slightly smaller capacity $C'$ without having to change the transformation line $Z'$, $L'$. This transformation giving the matching of $\bar{Z}_2$ with $Z_1$ is represented in Figure 5, by the transformation $\bar{Z}_2$, $\bar{P}_1$, $\bar{P}_2$, $\bar{P}_3$, $Z_1$ for which the capacities $C_1$ and $C_2$ are in the same ratio as in the transformation $Z_2$, $P_1$, $P_2$, $P_3$, $Z_1$, in which there is a compensation of the variations, as a function of the frequency, of the reactances corresponding to $C_1$, $C_2$ respectively.

The capacities $C_1$, $C_2$ thus give the means of matching a certain range of output impedances $Z_2$ with the input impedance $Z_1$ for a mean frequency $f_0$; they are given such values that their variations, upon a frequency variation about $f_0$, approximately cancel each other. The transformation line is given values $Z'$ and $L'$, such that for the average output impedance $Z_2$, the transmission qualities inside the desired band be optimal. For output impedances different from the mean $Z_2$, optimum transmission qualities are obtained by an adjustment of the capacities $C_1$, $C_2$, $C'$ according to what has already been stated. In this case, the transmission qualities are modified to a certain extent; this modification is smaller when the relative variation of the output impedance is smaller.

Due to the effect of the series capacity $C'$, the device embodying the invention is better than the simple adapter consisting of a single quarter wave line; it is possible to obtain a sufficient matching over a wider frequency range. Due to the use of capacities $C_1$ and $C_2$, an improvement is obtained as regards the possibility of matching a variable internal impedance within a certain range. It was noted that the two functions of the device are related to each other so that after an adjustment of the capacities $C_1$ and $C_2$, a correction of $C'$ improves the transmission qualities.

Generally, the frequency band passed is related to a proper adjustment of $C'$, while the most complete power transmission must be sought by adjusting the capacities $C_1$ and $C_2$.

A simple embodiment of the invention, taken by way of non limitative example, is represented in Figure 6. An outer cylindrical conductor A, common to the whole device, contains the inner conductor B, corresponding to the line which has a high characteristic impedance $Z_2$ and the inner conductor C forms the line with a small characteristic impedance $Z_1$. An element D is arranged so as to slide over C, thus forming an extension of adjustable length to the conductor C. The transformation line of intermediate impedance $Z'$ and length $L'$ is represented at E; this element is centered and attached inside A by an insulating support F, which consists of a dielectric with a very low dielectric constant, using as small an amount of dielectric as possible to avoid disturbances. A similar support G centers and attaches element D inside a tube H sliding inside the outer conductor A.

By displacing the assembly DGH, the distance between D and E is varied, which realizes the variable series capacity $C'$. This latter displacement is effected by means of the rod L, associated with H and sliding inside the slot I provided in the outer conductor A and of the screw M, screwed in H and sliding inside the slot J.

By adjusting this screw M more or less towards the conductor D the shunt capacity playing the part of $C_1$ is varied. The similar screw N plays the part of the variable shunt capacity $C_2$.

For certain applications, it is convenient to replace one or both capacities by lateral plungers with a capacitive input impedance, to have available, for instance, an outlet which makes it possible to vary a direct current in one of the inner conductors.

I claim:

1. An impedance transformation device operable over a wide frequency band in the hyperfrequency range, for matching a first impedance to a second impedance of widely different value, comprising a transformation line having at least one conductor and a length close to a quarter-wave length of the operating frequency and a characteristic impedance of a value intermediate between those of said first and second impedances and of a value between that equal to and that somewhat lower than the geometric mean of the values of said first and second impedances, and means coupling it between said first and second impedances, said coupling means including an adjustable series capacity in series with the line at one of its ends and two adjustable shunt capacities respectively connected in parallel with the above said first and second impedances, said second impedance being that of a transmission line having one or more conductors and means to adjust a conductor of one of said lines relatively to a corresponding conductor of the other of said lines to constitute said series capacity.

2. An impedance transformation device according to claim 1, wherein the ratio between the reactances of the said shunt capacities is substantially equal to the ratio of the impedances to be matched.

3. An impedance transformation device according to claim 1, wherein the said transformation and transmission lines include also a conductor common to said lines.

4. An impedance transformation device according to claim 3, wherein said lines are of the coaxial type and the said common conductor is the outer conductor.

5. An impedance transformation device according to claim 4, wherein the said first impedance is that of a transmission line of the coaxial type having its outer conductor common with said common conductor.

6. An impedance transformation device according to claim 4, wherein means to adjust the capacity connected in shunt of one or both of the said impedances to be matched and the means to adjust the series capacity are carried on the said outer conductor.

RICHARD WALLAUSCHEK.

REFERENCES CITED

The following references are of record in the file of this patent:

UNITED STATES PATENTS

| Number | Name | Date |
|---|---|---|
| 2,284,529 | Mason | May 26, 1942 |
| 2,405,437 | Leeds | Aug. 6, 1946 |
| 2,411,424 | Gurewitsch | Nov. 19, 1946 |
| 2,423,383 | Hershberger | July 1, 1947 |